United States Patent
Milvaney et al.

(10) Patent No.: US 10,929,814 B2
(45) Date of Patent: Feb. 23, 2021

(54) IN-CONTEXT DISPLAY OF OUT-OF-CONTEXT CONTACT ACTIVITY

(71) Applicant: Microsoft Technology Licensing, LLC, Redmond, WA (US)

(72) Inventors: Douglas Lane Milvaney, Somerville, MA (US); Benjamin Gustav Wilde, Quincy, MA (US); Arthur David Berman, Waltham, MA (US); Lyndsy Marie Stopa, Lancaster, NY (US); Christopher Ryan Botaish, Reading, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/401,911

(22) Filed: May 2, 2019

(65) Prior Publication Data
US 2020/0349514 A1  Nov. 5, 2020

(51) Int. Cl.
*G06F 3/0484* (2013.01)
*G06Q 10/10* (2012.01)
*H04L 29/08* (2006.01)
*H04L 12/58* (2006.01)

(52) U.S. Cl.
CPC ....... *G06Q 10/103* (2013.01); *G06F 3/04842* (2013.01); *G06Q 10/1093* (2013.01); *H04L 51/046* (2013.01); *H04L 67/22* (2013.01)

(58) Field of Classification Search
CPC . G06F 3/0482; G06F 3/04842; H04L 51/046; H04L 67/22
USPC ............................................... 715/751
See application file for complete search history.

(56) References Cited

U.S. PATENT DOCUMENTS

| | | | |
|---|---|---|---|
| 7,739,602 B2 * | 6/2010 | Feng | G06Q 10/10 715/733 |
| 8,566,301 B2 | 10/2013 | Rueben et al. | |
| 8,738,706 B1 | 5/2014 | Grieve et al. | |
| 8,739,021 B2 | 5/2014 | Yuniardi | |
| 9,053,079 B2 | 6/2015 | Bailor et al. | |
| 9,135,312 B2 | 9/2015 | Greenspan et al. | |
| 9,207,832 B1 * | 12/2015 | Khouri | G06Q 10/10 |
| 9,614,880 B1 * | 4/2017 | Davis | H04L 67/26 |
| 2003/0046296 A1 * | 3/2003 | Doss | H04L 51/04 |
| 2005/0091314 A1 * | 4/2005 | Blagsvedt | G06F 3/04842 709/204 |

(Continued)

OTHER PUBLICATIONS

"Final Office Action Issued in U.S. Appl. No. 14/982,832", dated Oct. 30, 2019, 19 Pages.

(Continued)

*Primary Examiner* — Daniel Rodriguez

(57) ABSTRACT

Systems, methods, and software are disclosed herein for enhancing the awareness of the activity of others in a collaboration group. In an implementation, a contact that identifies a person is displayed in a user interface to an application. A determination is made whether the person is in a collaboration group with a user of the application. If so, a further determination is made whether that person is presently active in a content item in a context other than the present context of the user. When such conditions are satisfied, an indication is surfaced in the user interface that the person is active in the content item.

20 Claims, 10 Drawing Sheets

(56) References Cited

U.S. PATENT DOCUMENTS

| | | | |
|---|---|---|---|
| 2005/0210102 A1* | 9/2005 | Johnson | H04L 67/22 709/204 |
| 2007/0060205 A1 | 3/2007 | Kim | |
| 2007/0233811 A1* | 10/2007 | Rochelle | G06F 40/174 709/219 |
| 2008/0201438 A1* | 8/2008 | Mandre | H04L 67/22 709/206 |
| 2009/0083656 A1* | 3/2009 | Dukhon | G06F 3/0482 715/781 |
| 2009/0222763 A1* | 9/2009 | Dukhon | G06F 3/0482 715/808 |
| 2010/0023851 A1 | 1/2010 | Schormann | |
| 2010/0199340 A1* | 8/2010 | Jonas | G06Q 10/10 726/8 |
| 2012/0185762 A1 | 7/2012 | Ozer et al. | |
| 2012/0210247 A1* | 8/2012 | Khouri | G06F 3/0482 715/751 |
| 2012/0271867 A1 | 10/2012 | Grossman et al. | |
| 2012/0272151 A1 | 10/2012 | Grossman et al. | |
| 2013/0124956 A1* | 5/2013 | Hatfield | G06F 40/197 715/211 |
| 2013/0159849 A1* | 6/2013 | Lee | G06F 40/169 715/272 |
| 2013/0262420 A1 | 10/2013 | Edelstein et al. | |
| 2014/0033068 A1 | 1/2014 | Gupta et al. | |
| 2014/0267130 A1* | 9/2014 | Hwang | G06F 3/0488 345/174 |
| 2014/0279843 A1 | 9/2014 | Von Weihe | |
| 2014/0281872 A1 | 9/2014 | Glover | |
| 2014/0298198 A1 | 10/2014 | Kuchibhotla et al. | |
| 2015/0100580 A1 | 4/2015 | Mathur et al. | |
| 2015/0134600 A1 | 5/2015 | Eisner et al. | |
| 2015/0261732 A1* | 9/2015 | Kim | G06F 40/166 715/229 |
| 2015/0331578 A1* | 11/2015 | Keslin | G06F 3/04817 715/751 |
| 2015/0339282 A1 | 11/2015 | Goyal | |
| 2015/0350264 A1* | 12/2015 | Hyodo | G06F 40/166 715/753 |
| 2016/0092040 A1* | 3/2016 | Sherman | H04L 51/32 715/752 |
| 2017/0003835 A1* | 1/2017 | Shaffer | G06F 7/08 |
| 2017/0004119 A1* | 1/2017 | Wilde | G06F 40/166 |
| 2017/0185574 A1 | 6/2017 | Fern et al. | |
| 2017/0285890 A1* | 10/2017 | Dolman | G06Q 10/101 |
| 2017/0323243 A1* | 11/2017 | Knight | G06Q 10/06393 |
| 2018/0052587 A1* | 2/2018 | LaPier | G06F 3/0482 |
| 2018/0181723 A1* | 6/2018 | von Muhlen | G06F 16/1873 |
| 2018/0367483 A1* | 12/2018 | Rodriguez | H04L 51/046 |
| 2019/0124169 A1* | 4/2019 | Sundin | G06Q 10/101 |
| 2019/0378090 A1* | 12/2019 | Bastide | G06Q 10/103 |
| 2019/0391861 A1* | 12/2019 | Emerick | G06F 16/2477 |
| 2019/0394147 A1* | 12/2019 | Rodriguez | H04L 51/04 |

OTHER PUBLICATIONS

"Quip changes the way teams work together", Retrieved From: https://quip.com/about/tour, Retrieved Date: Oct. 9, 2015, 5 Pages.

"Revision control—Wikipedia the free encyclopedia", Retrieved From: http://en.wikipedia.org/w/index.php?title=Revision_control&oldid=589765566, Jan. 8, 2014, 10 Pages.

"Team Up to Build Powerful Documents", Retrieved From: https://www.zoho.com/writer/, Retrieved Date: Oct. 9, 2015, 7 Pages.

"Final Office Action Issued in U.S. Appl. No. 14/982,832", dated Dec. 21, 2017, 17 Pages.

"Final Office Action Issued in U.S. Appl. No. 14/982,832", dated Nov. 9, 2018, 19 Pages.

"Non Final Office Action Issued in U.S. Appl. No. 14/982,832", dated May 9, 2018, 18 Pages.

"Non Final Office Action Issued in U.S. Appl. No. 14/982,832", dated Jul. 21, 2017, 17 Pages.

"Non Final Office Action Issued in U.S. Appl. No. 14/982,832", dated May 24, 2019, 20 Pages.

Bendix, et al., "VTML for Fine-Grained Change Tracking in Editing Structured Documents", In Proceedings of 9th International Symposium on System Configuration Management, Sep. 5, 1999, 18 Pages.

"International Search Report and Written Opinion Issued in PCT Application No. PCT/US2016/066743", dated Apr. 6, 2017, 18 Pages.

Somers, James, "How I Reverse Engineered Google Docs", Retrieved From: http://features.jsomers.net/how-i-reverse-engineered-google-docs/, Nov. 5, 2014, 11 Pages.

"International Search Report and Written Opinion Issued in PCT Application No. PCT/US2020/026972", dated May 27, 2020, 11 Pages.

\* cited by examiner

IN-CONTEXT DISPLAY OF OUT-OF-CONTEXT CONTACT ACTIVITY

TECHNICAL FIELD

Aspects of the disclosure are related to the field of software applications, and in particular, dynamic contacts in applications.

TECHNICAL BACKGROUND

Collaboration tools in software applications and services have continued to improve the ability of users to work in groups on shared content items, such as word processing documents, spreadsheets, and presentations. Such tools not only allow users to work on the same documents, but also allow them to communicate within the context of the application which they are using to edit a document.

Outside of the context of the application, users may receive email updates from a collaboration service regarding the editing activities of others in their collaboration groups while they were away from a document. Users may also communicate directly with each other out of band with respect to the application, to keep each other apprised of their progress on a document.

These and other solutions unfortunately share the same characteristic of being time delayed with respect to the activity of users in a collaboration group. Unless a given user is active in the context of a collaboration group and application, the user only becomes aware of the activity of others after the fact and, even then, only via limited channels (e.g. email). Once a user is made aware of the activity, the authoring session has likely ended and the opportunity for real-time collaboration has passed.

OVERVIEW

Technology is disclosed herein for enhancing the ability of users to collaborate in real-time. In an implementation, a contact that identifies a person is displayed in a user interface to an application. A determination is made whether the person is in a collaboration group with a user of the application. If so, a further determination is made whether that person is presently active in a content item in a context other than the present context of the user. When such conditions are satisfied, an indication is surfaced in the user interface that the person is active in the content item.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, like reference numerals in the drawings designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Technology disclosed herein reduces friction in the collaboration process by making users aware, in their present context, of the activity of others outside of their context. In this manner, a user in a collaboration group is enabled to join others in real-time who are presently working on a shared content item.

In various examples, a user may be working in one application context such as a user interface to an email application, a calendar application, a file system, a spreadsheet application, a contacts application, a word processing application, or an operating system feature. As the user belongs to one or more collaboration groups, the user may be interested in knowing when other members of the group are working in documents associated with the groups. Rather than being notified after-the-fact by email or when the user next engages with the shared item, the user is instead notified in real-time in the user's present context of another person's activity.

In one example, a user may be viewing or editing an email within the context of an email application. A contact in the email, such as a person identified in an address field of the email, may be active in a collaboration item. When the user provides an indication of interest with respect to the contact, the status of the person as working in the shared content item is surfaced, thereby providing the user with an opportunity to collaborate.

In another example, a user may be working in a spreadsheet that includes a list of contacts in its cells. A person identified by one of the contacts who is in a collaboration group with the user may be presently active in a shared content item. The user may select, hover over, or otherwise provide an indication of interest with respect to the contact, which triggers the active status of the person to be surfaced in the user interface to the spreadsheet.

In many other examples, users operating in one context are made aware of the active status of other people in other contexts, thereby encouraging the users to collaborate with members of their collaboration groups in real-time. The users may be active in a variety of contexts, such as note taking applications, gaming applications, business intelligence applications, or any other application in which a contact for another person may be displayed. If the other person is in a collaboration group with the user and is active in an associated content item, then the user may be conveniently notified in their present context, which increases the likelihood that productive, real-time collaboration will occur.

Figure 1:
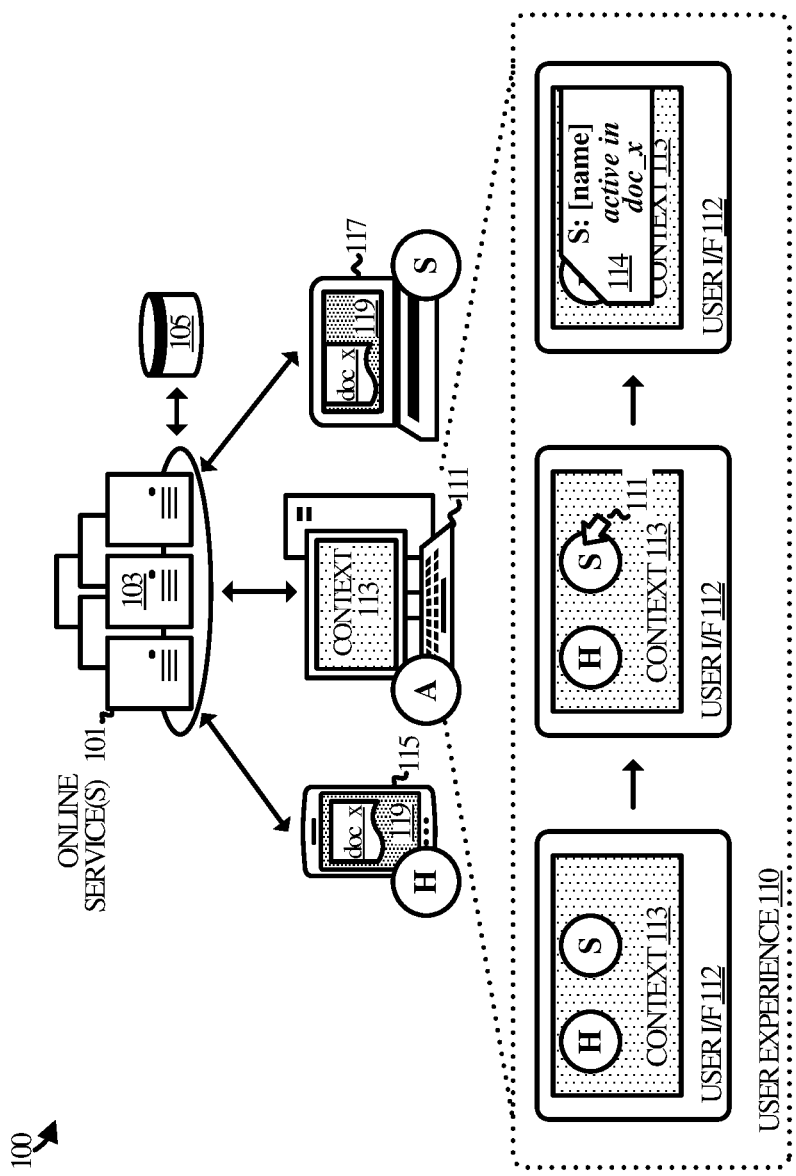
FIG. 1 illustrates an operational environment in an implementation.

Referring now to the drawings, FIG. 1 illustrates an operational environment 100 in an implementation of dynamic contacts. Operational environment 100 includes an online service 101, database 105, computing device 111, computing device 115, and computing device 117. Computing devices 111, 115, and 117 communicate with online service 101 to interface with one or more application services provided by online service 101 such as (but not limited to) email, calendars, productivity applications, gaming, social networking, search, and the like.

Figure 10:
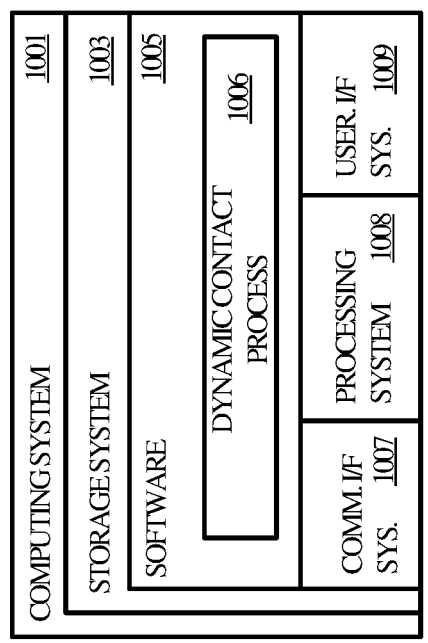
FIG. 10 illustrates a computing system suitable for implementing the various operational environments, architectures, processes, scenarios, and sequences discussed below with respect to the Figures.

Online service 101 may be implemented on one or more computing devices 103 having an architecture as illustrated with respect to computing device 1001 in FIG. 10. In addition, online service 101 may be implemented as a stand-alone service or in the context of one or more other services. Online service 101 communicates with computing devices 111, 115, and 117 over one or more communication networks not shown for purposes of clarity.

Computing devices 111, 115, and 117 each include one or more applications capable of interfacing with online service 101 with respect to the various application services provided by online service 101. Examples of the applications include, but are not limited to, email applications, calendar applications, productivity applications, gaming applications, social networking applications, search applications, and the like. The applications may be natively installed and executed applications, browser-based applications, mobile applications (or "apps"), streamed or streaming applications, or any combination or variation thereof.

Each of computing devices 111, 115, and 117 may also have a computing architecture as illustrated with respect to computing device 1001 in FIG. 10. Examples of computing devices 111, 115, and 117 include, but are not limited to, personal computers (e.g. laptops and desktops), tablet computers, mobile phones, computing appliances, wearable computing devices, and gaming devices.

Figure 2:
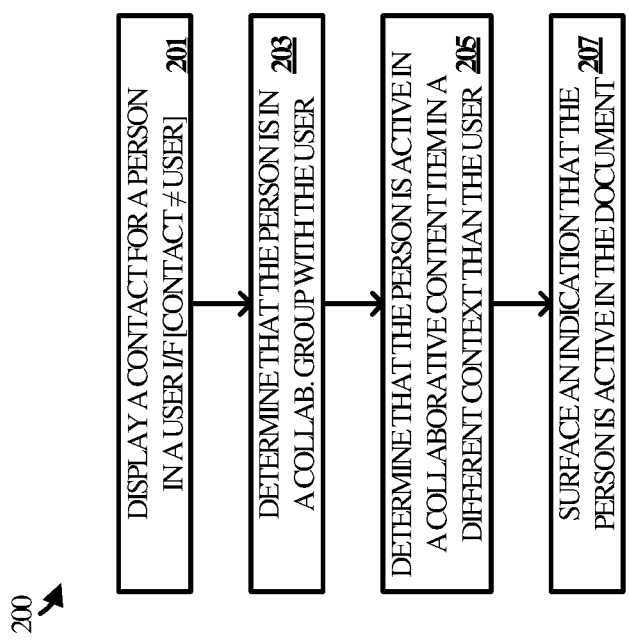
FIG. 2 illustrates a dynamic contact process in an implementation.

FIG. 2 illustrates a dynamic contact process 200 that may be implemented by an application running on any one or more of computing devices 111, 115, and 117, by online service 101, or distributed between the application and the online service 101. The application and/or service employ dynamic contact process 200 to enhance the user experience when interacting with contacts. Dynamic contact process 200 may be implemented in program instructions in the context of any of the modules, components, or other such programming elements of the application and/or service. The program instructions direct the underlying computing system(s) to operate as described for dynamic process 200, referring parenthetically to the steps in FIG. 2.

To begin, the program instructions direct the computing system(s) to display a contact in a user interface to an application (step 201). The contact in this step identifies a person other than a user of the application and may be, for example, a name, phone number, email address, service handle, or other such information that identifies a person. In some scenarios, the contact may identify an entity other than a person, such as a conversational bot. The contact is displayed within the context of the user application such as in a contact card, a field or the content of an email, the content of a document, a field or the content of a calendar item, a cell in a spreadsheet, or the properties of an element in a file system.

Next, the program instructions direct the computing system(s) to determine that the person is in one or more collaboration groups with the user (step 203). The one or more collaboration groups may be associated with one or more content items. For instance, an exemplary collaboration group may include a group of people authorized to edit one or more shared documents, spreadsheets, notebooks, or other such content items associated with the group. The determination that the person is in a collaboration group with the user may be made by querying a database (e.g. database 105) that stores the identity of collaboration groups and their respective users. In another example, the determination may be made by querying a service that maintains such data. The users may be identified by various contact information, such as their names, phone numbers, email addresses, service handles, or other suitable contact information.

Having determined that the person is in a collaboration group with the user, the program instructions direct the computing system(s) to determine whether the person is active in a collaborative content item, but in a context other than the context of the user (step 205). For example, if the user is working on one document, then the person identified by the contact may be active in a different document. In another example, if the user is drafting an email within the context of an email application, the person may be active in a document in the context of a word processing application. In still another example, if the user is navigating a file system, the person may be active in one of the documents identified by the file system.

The program instructions then direct the computing system(s) to surface an indication that the person identified by the contact is active in the content item in the other context (step 207). Surfacing the indication means causing the indication to be displayed in the foreground of the user interface. In some implementations, causing the indication to be displayed may include rendering the indication to the display screen. In other implementations, causing the indication to be displayed may include requesting an operating system component(s), element(s) or layer(s) to render the indication. Surfacing the indication may be accomplished by, for example, displaying information proximate to the contact indicative of the person's active status in the content item. The person's status may be displayed in a contact card, in an informational bubble, in a side bar, or in any other manner within the active context of the user. They user may thus choose to communicate with the contact, switch to the collaborative content item, or otherwise take action in response to learning that the other person is active in the content item, outside of the user's present context.

Referring back to FIG. 1, a brief user experience 110 illustrates various aspects of dynamic contact process 200. User experience 110 includes a user interface 112 to an application utilized by user A. The user experience includes an application context 113 within which contacts for user H and user S are displayed. In contrast, user H and user S are engaged in a different context 119 than context 113, e.g. editing a collaborative document.

User A proceeds to supply user input 111 comprising an indication of interest with respect to the contact for user S. User input 111 may be, for instance, a hover action over the contact, a mouse click on the contact, a touch gesture made with respect to the contact, or a voice command directed to the contact. In response, the status of user S is surfaced in user interface 112. The status is indicated in a contact card 114 for user S in this example, although the status information could be displayed on a variety of different surfaces.

In this example, contact card 114 includes status information that indicates that user S is active in document x. Since user A is part of a collaboration group to which document x belongs, such information may prompt the user to open the document and join the collaboration session with user S and any other users that may be in the document.

Figure 3:
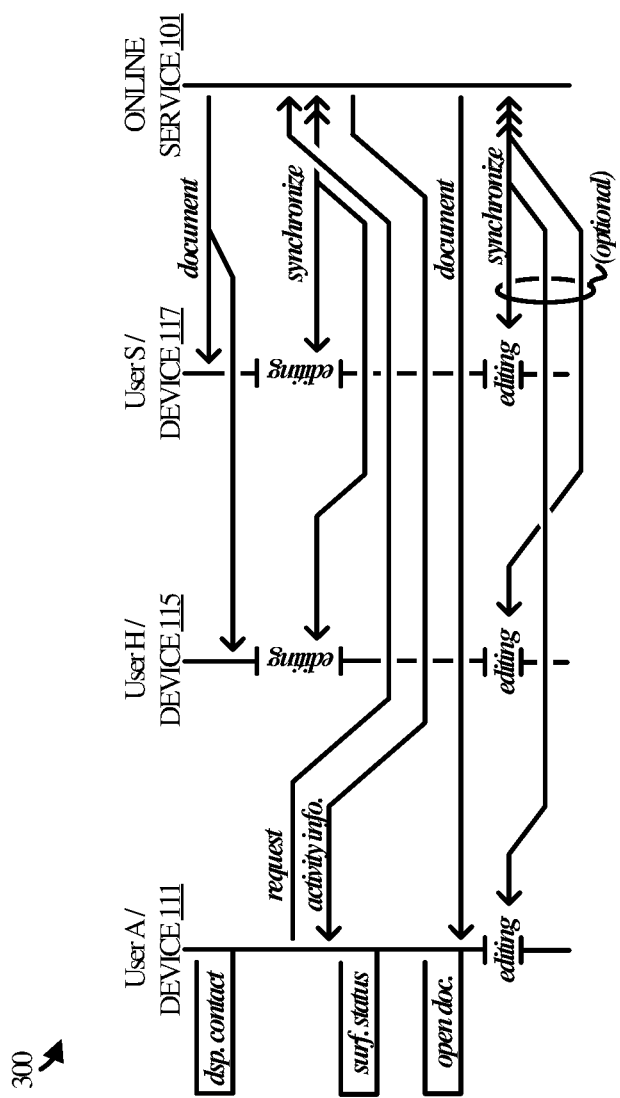
FIG. 3 illustrates an operational sequence in an implementation.

FIG. 3 illustrates an operational sequence 300 to depict additional aspects of dynamic contact process 200 in an implementation. In operation, user H and user S, utilizing applications on computing device 115 and computing device 117 respectively, open a document. It may be assumed for exemplary purposes that the document is a shared document associated with a collaboration group, to which user H and user S belong, such that the edits they make are synchronized between their respective versions of the document. It may also be assumed that user A belongs to the same collaboration group.

In the meantime, user A is engaged in a different application context than user H and user S. For instance, user A may be drafting an email, working in a spreadsheet, or searching for files in a file system, rather than editing the shared document in the context of a word processing application. While user A is working, a contact is surfaced in the user interface to the application user A is using. The contact is for user H and may identify her by one or more of a name, email address, telephone number, service handle, or other such identifiers. The contact may be surfaced because, for example, user A is drafting or viewing an email that includes user A, viewing a list of contacts that includes user A, or entering contacts into a spreadsheet workbook.

In response to user input or automatically, the application being used by user A sends a status request for the activity status of the person associated with the contact that was surfaced. The request is sent to online service and may identify the person by their name, alias, email address, phone number, service handle, or other such identifying information drawn from the contact. Online service 101 receives the request and, after determining that the person is in a collaboration group with user A, returns the status of the person. The application on computing device 111 receives the status and surfaces information about the other user's activity in the user interface being used by user A.

In this example, the activity information that is surfaced indicates to user A that user H is presently editing a document associated with a collaboration group to which user A belongs. User A is therefore prompted to open the document himself and proceeds to engage in collaborative editing with user H and user S. Their respective edits to the document are persisted and synchronized across their respective copies.

Figure 4:
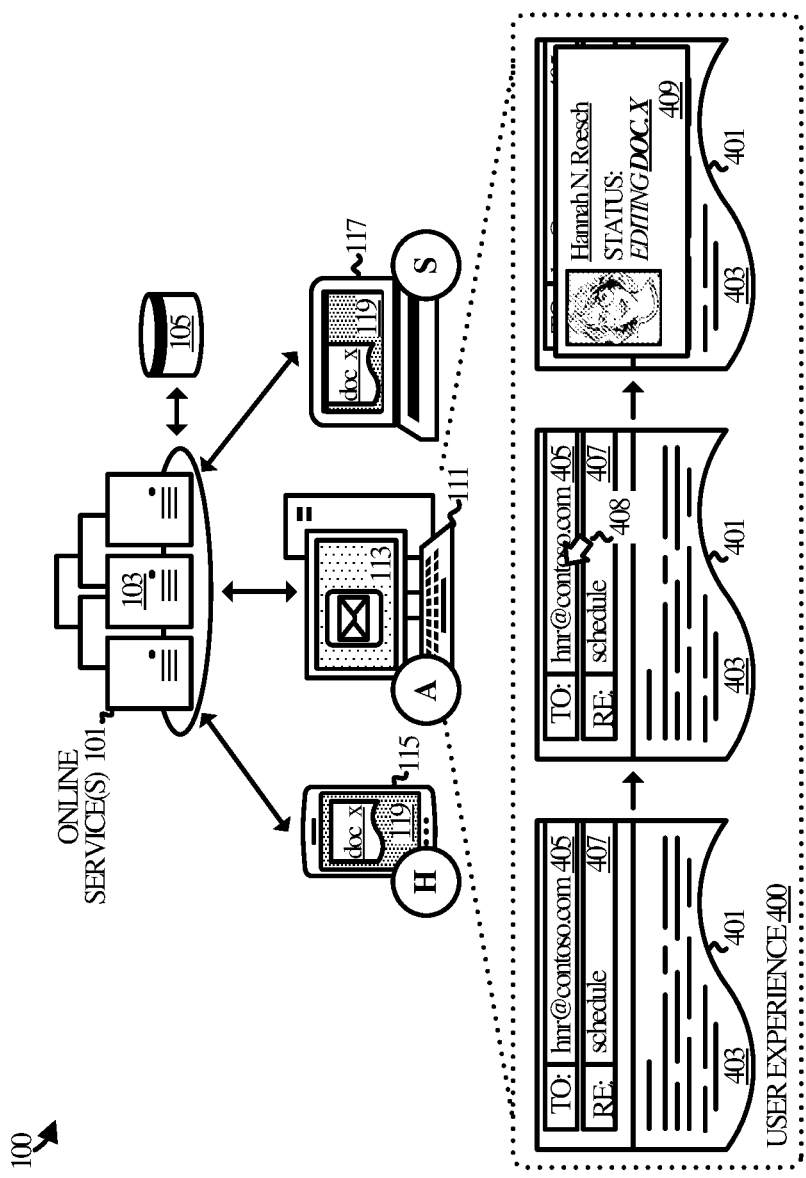
FIG. 4 illustrates a user experience and related operational scenario in an implementation.

FIG. 4 illustrates a user experience 400 in an example of dynamic contact process 200 with respect to the elements of operational environment 100. User experience 400 includes a user interface 401 to an email application. User interface 401 in this example comprises a draft email. The draft email includes a content canvas 403 for typing text or otherwise providing content to be sent in the email. The draft email also includes field 405, for inputting recipient addresses, and field 407, for inputting the subject of the email.

Field 405 includes one contact for another user. The contact is an email address hnr@contoso.com, which may be assumed for exemplary purposes to belong to user H. User A proceeds to provide user input 408, which comprises an indication of interest in the contact in the recipient field. User input 408 may be, for instance, a hover action, a mouse click, a touch gesture, a spoken command, or the like.

In response to user input 408, a contact card 409 is surfaced in the user interface. Contact card 409 includes identifying information for user H, such as her name and a photo. Contact card 409 also includes information indicative of her active status, which is editing document x. User A may thus be prompted to open document x since he will see that it would be a good opportunity to engage with others who are presently in the document.

Figure 5:
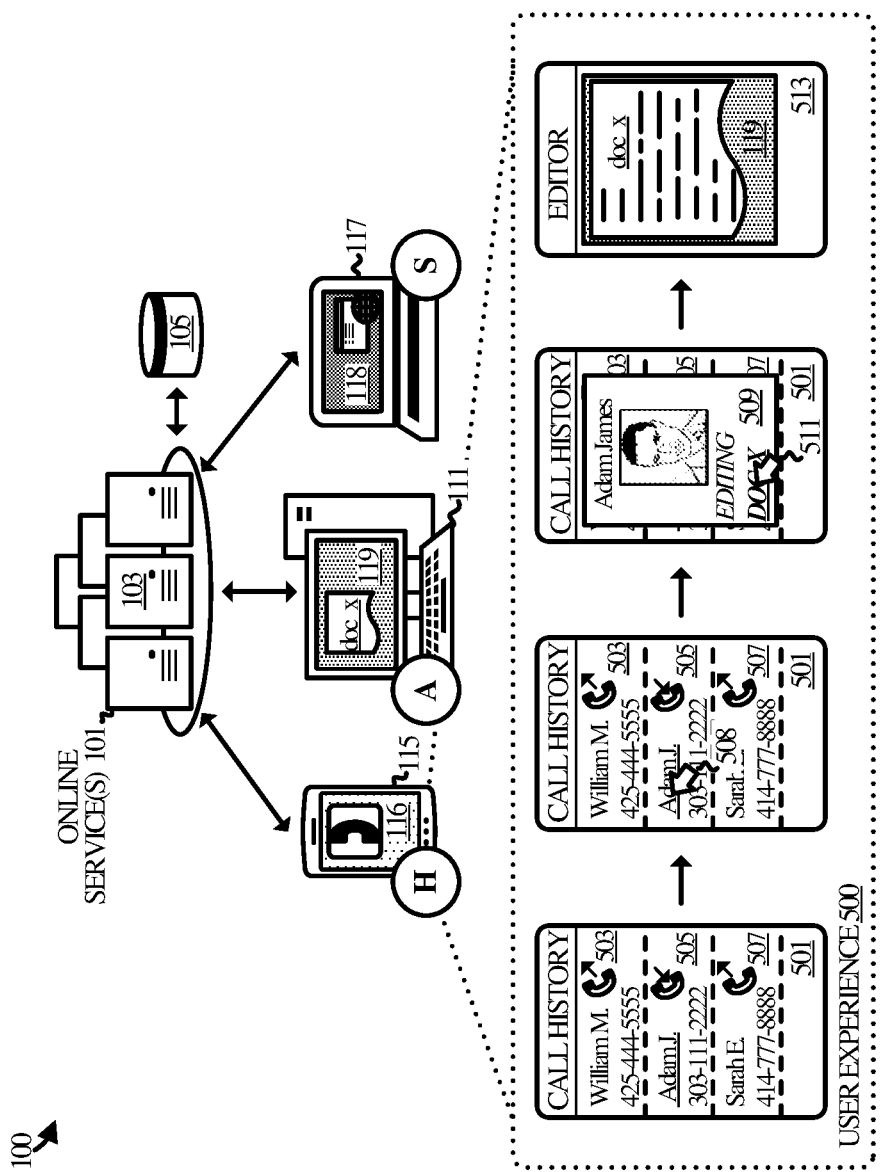
FIG. 5 illustrates a user experience and related operational scenario in an implementation.

FIG. 5 illustrates a user experience 500 in another example of dynamic contact process 200 with respect to the elements of operational environment 100. User experience 500 includes a user interface 501 to dialer application used by user H on computing device 115. The context 116 of user H differs from that of user A who is experiencing context 119 (editing document x). In addition, context 116 differs from that of context 118 experienced by user S.

User interface 501 includes various contacts in a call history, represented by contact 503, contact 505, and contact 507. User H supplies user input 508 which comprises a selection of contact 505. Next, a contact card 509 for the person in contact 505 is surfaced in user interface 501. Contact card 509 identifies user A and his present activity status, which comprises editing document x in context 119. This activity status is shown to user H because user H belongs to the same collaboration group associated with document x.

User H supplies another user input 511, but with respect to a link to the shared document. Selecting the link causes the document to download. The document opens in a new user interface 513 to a word processing application. User H may now edit, review, or otherwise consume the same document that user A is working in.

Figure 6:
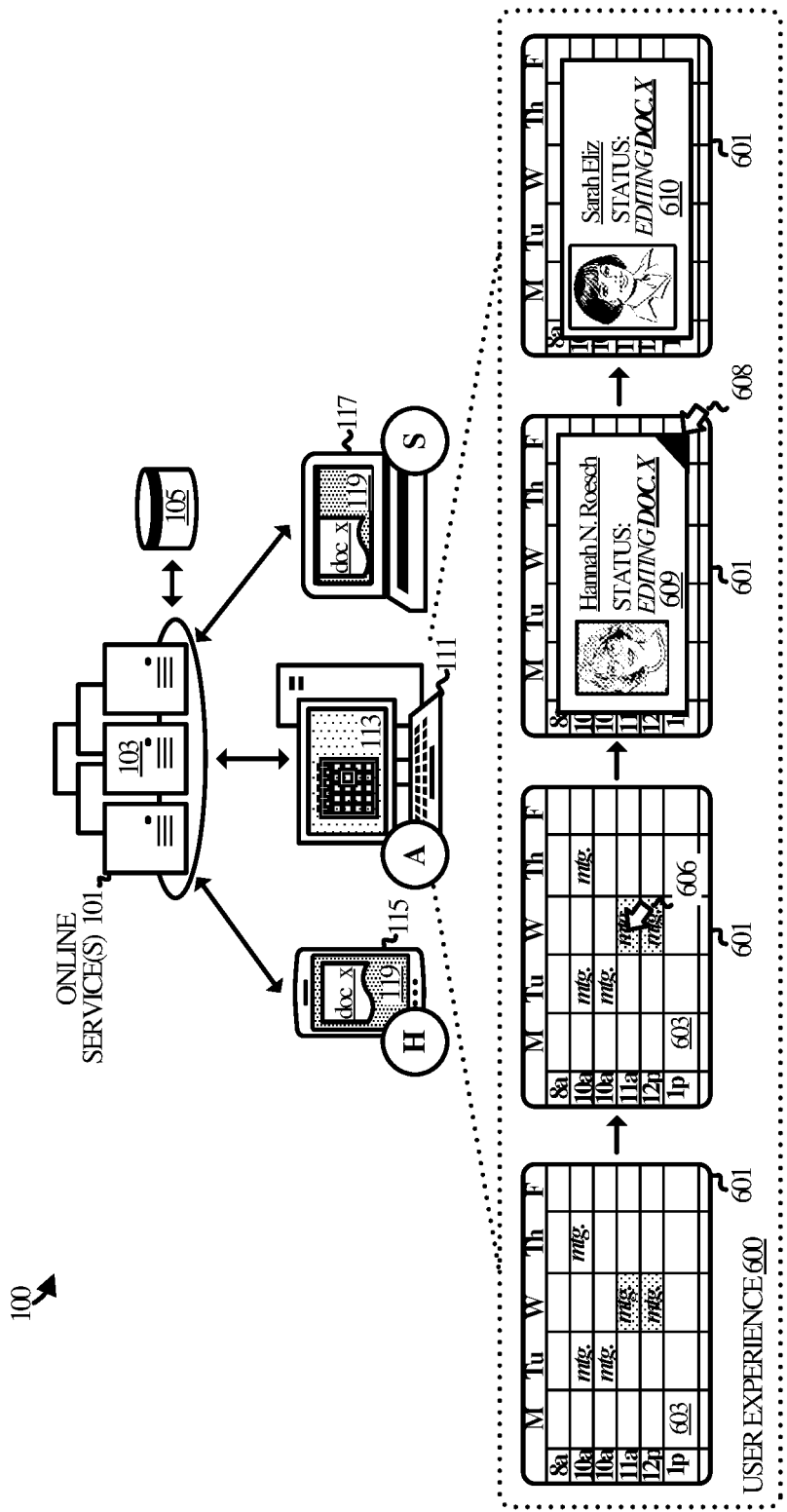
FIG. 6 illustrates a user experience and related operational scenario in an implementation.

FIG. 6 illustrates a user experience 600 in another example of dynamic contact process 200 with respect to the elements of operational environment 100. User experience 600 includes a user interface 601 to a calendar application used by user A on computing device 111. The context 113 of user A differs from that of user H who is experiencing context 119 (editing document x). In addition, context 113 differs from that of context 119 experienced by user S.

User interface 601 includes various meetings scheduled throughout the week. The meetings show by different fill patterns whether they involve a person who is in a collaborative group with user A and who is presently active in a shared document. For example, the meetings on Tuesday and Thursday do not include any overlapping contacts, whereas the meeting block on Wednesday does.

User A navigates to the highlighted meeting block accordingly and supplies user input 606 as an indication of interest with respect to the meeting block. In response, a contact card 609 for at least one of the attendees at the meeting is surfaced. Contact card 609 identifies the name and status of user H because she is in a collaborative group with user A and because she is presently editing a shared document.

The contact card 609 also includes a link at the bottom-right corner that indicates that a second attendee is also in a collaboration group with user A and is also active in a document. User A supplies user input 608 comprising a selection of the link, in response to which contact card 610 is surfaced. Contact card 610 includes the name of user S as well as her present status as working in the document.

Figure 7:
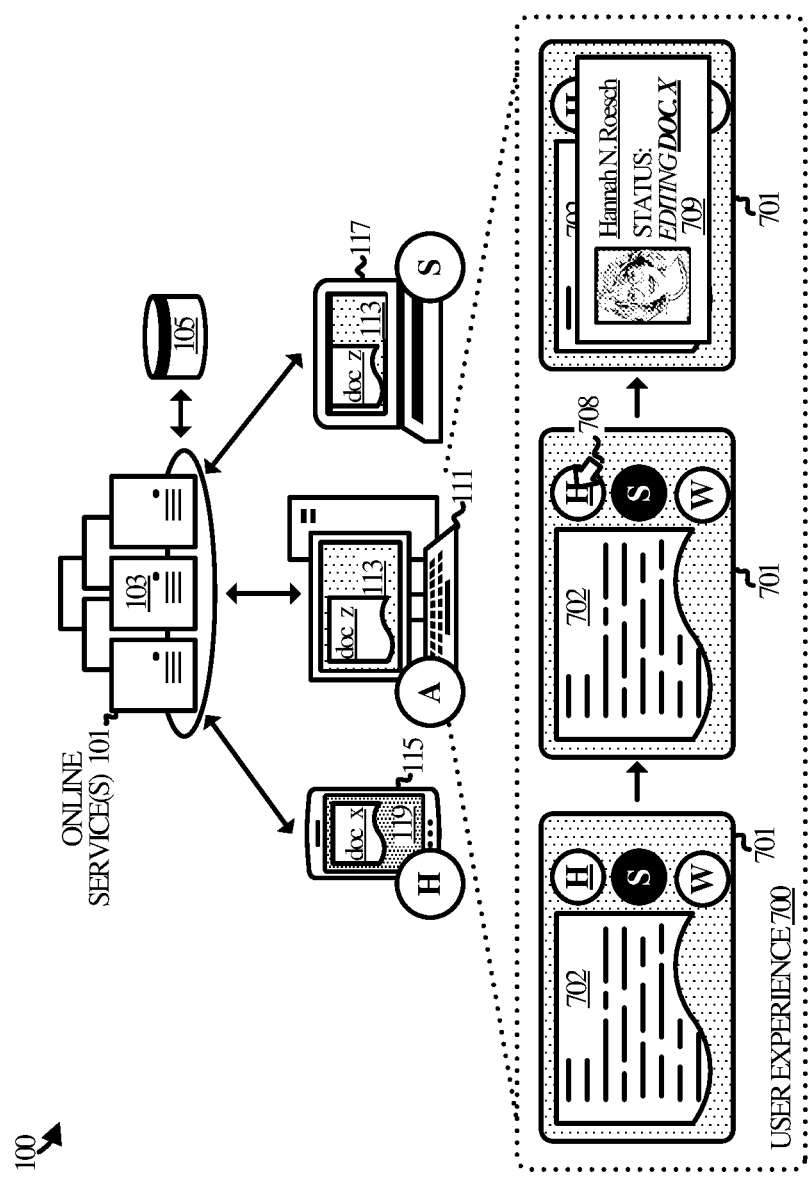
FIG. 7 illustrates a user experience and related operational scenario in an implementation.

In user experience 700 in FIG. 7, the users are engaged in similar activities document editing using similar applications. However, the context of user A differs from that of user H because they are editing different documents. User A and user S are working in the same document and as such their contexts may be considered to be the same.

User experience 700 includes a user interface 701 to the word processing document with which user A edits document z. User interface 701 includes a document canvas 702 on which the user may input content and otherwise interact with the document.

It is assumed for exemplary purposes that document z is a shared document associated with a collaboration group that includes user A, user H, user S, and user W. Accordingly, user interface 701 includes contacts for those users (H, S, and W). In addition, the contacts have an appearance indicative of the state of the person represented by a given contact. For instance, the contact for user H indicates that she is active in a context different from user A (e.g. she is editing document x as opposed to document z). The contact for user S has a shading that indicates that she is active in the same context as user A. Finally, the contact for user W indicates that he is neither active in the same nor a different context.

User A proceeds to supply user input 708 with respect to the contact for user H. In response, contact card 709 is surfaced in user interface 701. User A may decide to click on the link for document x, thereby bringing him into the same context as user H.

Figure 8:
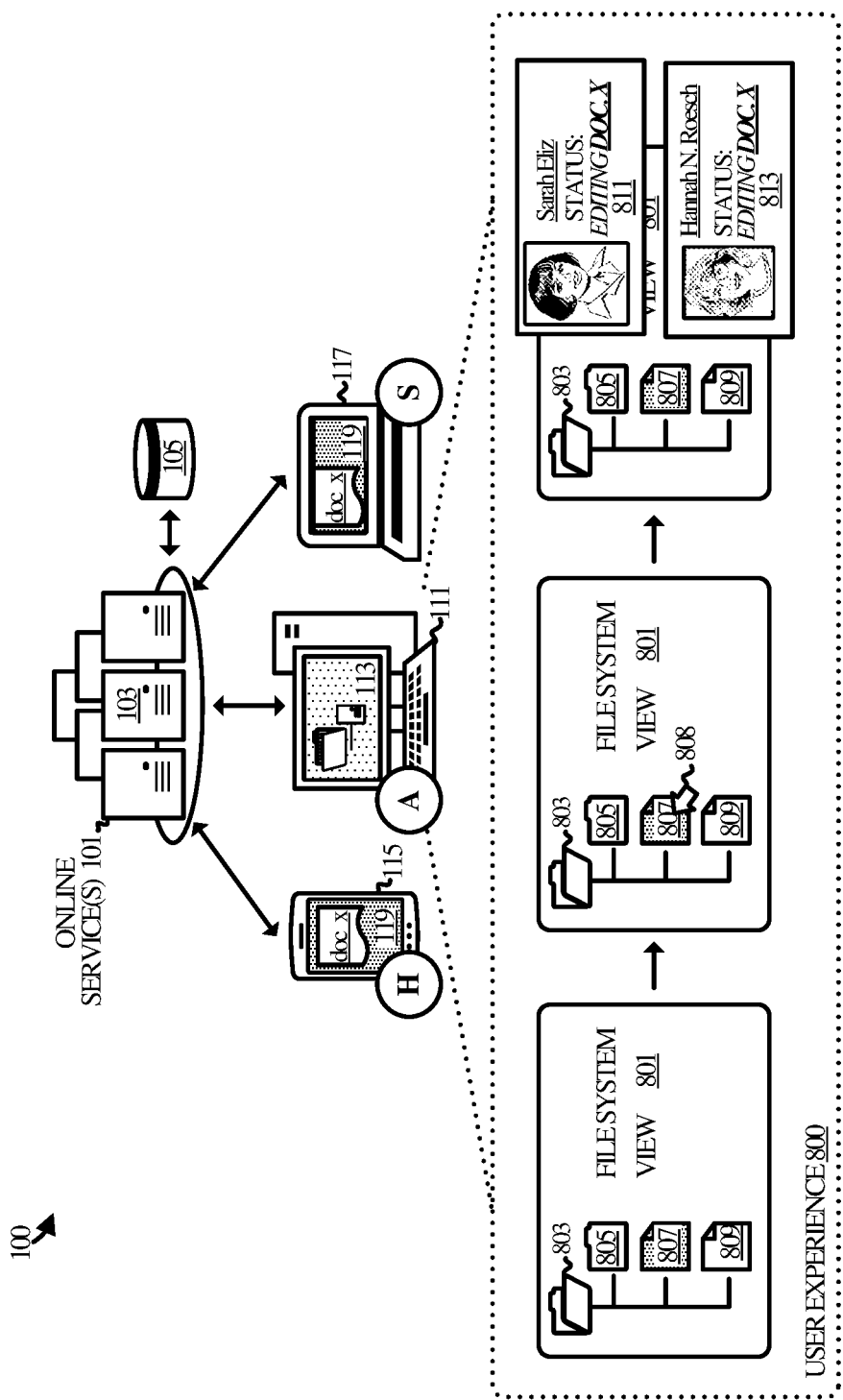
FIG. 8 illustrates a user experience and related operational scenario in an implementation.

FIG. 8 illustrates a user experience 800 pertaining to a file system context. User experience 800 includes a file system view 801 to a file system that may be displayed in a user interface. File system view 801 includes a folder 803, a sub folder 805, and two files, represented by file icon 807 and file icon 809. File system view 801 is presented to user A in the context 113 of the file system on computing device 111. At the same time, user H is engaged in context 119 with document x, as is user S.

Document X may be assumed for exemplary purposes to correspond to file icon 807. That is, file icon 807 is the file icon for document x, meaning that clicking on or otherwise selecting file icon 807 leads to the document opening. Here, the icons may take on different appearances depending upon whether the documents are associated with a collaboration group and whether any members of the group are presently active in the document.

As noted, user H and user S are both active in the document associated with file icon 807, while no others are active in file icon 809. Accordingly, the appearance of file icon 807 is shaded to indicate to user A that one or more people may be active in the document in a context other than the file system context of computing device 111.

In a next step, user A supplies user input 808 to indicate interest in file icon 807. User input 808 may be, for instance, a hover action, a mouse-click, a touch gesture, a spoken command, or any other suitable user input. In response to user input 808, contact cards for one or more people active in the document are surfaced. Contact card 811 in this example presents the name and status of user S, while contact card 813 presents the name and status of user H. User A may thus be motivated to contact one or both of the other users in order to collaborate with them on the shared document in real-time.

Figure 9:
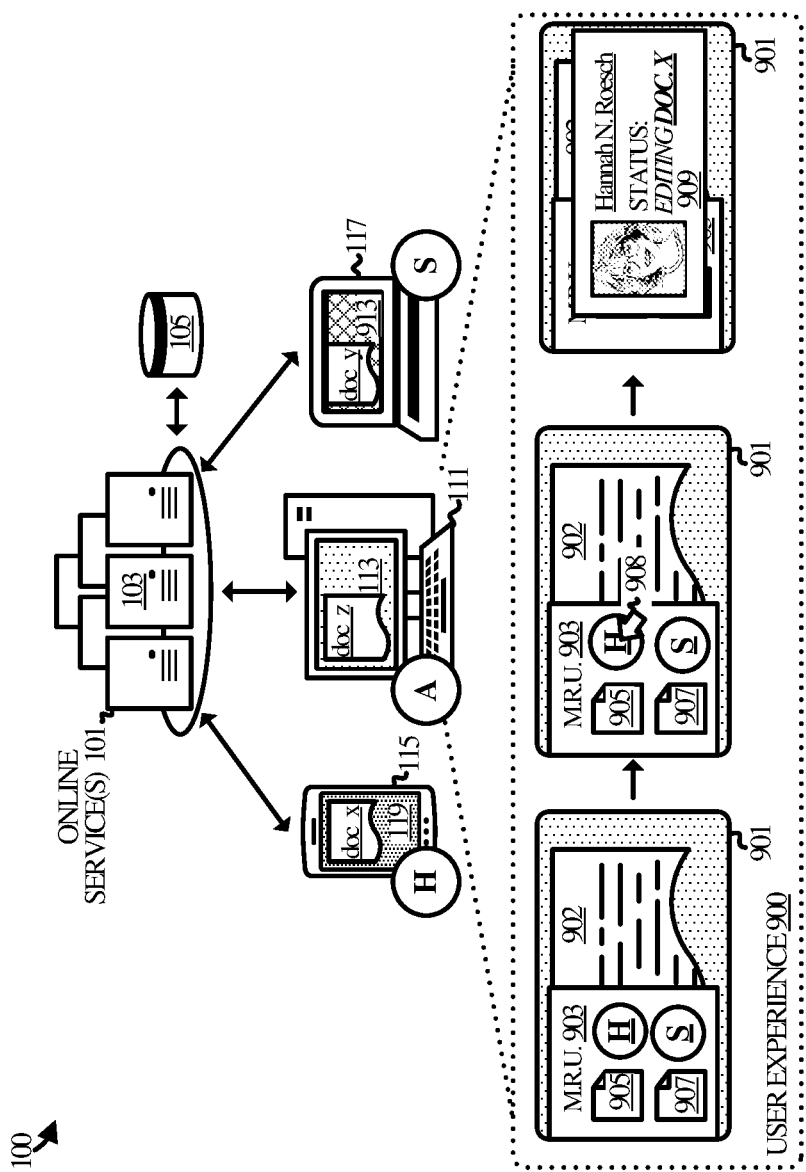
FIG. 9 illustrates a user experience and related operational scenario in an implementation.

In user experience 900 in FIG. 9, the users are engaged in document editing using similar applications. However, the context of user A differs from that of user H because they are editing different documents (document z and document x respectively). User A and user S are also working in different documents (document z and document y respectively) and thus their contexts also differ.

User experience 900 includes a user interface 901 to the word processing document with which user A edits document z. User interface 901 includes a document canvas 902 on which the user may input content and otherwise interact with the document. User interface 901 also includes a most recently used (MRU) list 903. MRU list 903 is a list of documents most recently used by user A. In this example, file icon 905 corresponding to document x is included in the list, as is file icon 907 corresponding to document y.

It is assumed for exemplary purposes that document x and document y are shared documents associated with collaboration groups that include user A. Accordingly, MRU list 903 also includes contacts for user H and user S displayed in association with the file icons or document x and document y. The contacts are present because the users are presently active in their respective documents. User A may supply user input 908 to one or the other of the contacts to see the active status of the corresponding person. For example, contact card 909 is surfaced in user interface 901 displaying contact information for user H and her status as presently editing document x.

Various technical effects may be appreciated from the foregoing discussion of dynamic contact technology. The user experience is improved and simplified by making users aware of the status of others outside of the present status of a given user. In this manner, the user need not switch between contexts in order to ascertain the status of another person. This may increase the opportunity for users in collaboration groups to work together in real-time. This may also have the added benefit of reducing the time to complete a project and increasing the efficiency of the project which, in the aggregate, accrue as a savings of processing cycles, power consumption, and other such tangible benefits.

FIG. 10 illustrates a computing system 1001 that is representative of any system or collection of systems in which the various processes, programs, services, and scenarios disclosed herein may be implemented. Examples of computing system 1001 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 1001 may be implemented as a single apparatus, system, or device or may be implemented in a distributed manner as multiple apparatuses, systems, or devices. Computing system 1001 includes, but is not limited to, processing system 1002, storage system 1003, software 1005, communication interface system 1007, and user interface system 1009 (optional). Processing system 1002 is operatively coupled with storage system 1003, communication interface system 1007, and user interface system 1009.

Processing system 1002 loads and executes software 1005 from storage system 1003. Software 1005 includes and implements process 1006, which is representative of the dynamic contact technology discussed with respect to the preceding Figures. When executed by processing system 1002 to provide dynamic contacts, software 1005 directs processing system 1002 to operate as described herein for at least the various processes, operational scenarios, and sequences discussed in the foregoing implementations. Computing system 1001 may optionally include additional devices, features, or functionality not discussed for purposes of brevity.

Referring still to FIG. 10, processing system 1002 may comprise a micro-processor and other circuitry that retrieves and executes software 1005 from storage system 1003.

Processing system 1002 may be implemented within a single processing device but may also be distributed across multiple processing devices or sub-systems that cooperate in executing program instructions. Examples of processing system 1002 include general purpose central processing units, graphical processing units, application specific processors, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1003 may also include computer readable communication media over which at least some of software 1005 may be communicated internally or externally. Storage system 1003 may be implemented as a single storage device but may also be implemented across multiple storage devices or sub-systems co-located or distributed relative to each other. Storage system 1003 may comprise additional elements, such as a controller, capable of communicating with processing system 1002 or possibly other systems.

Software 1005 (including process 1006) may be implemented in program instructions and among other functions may, when executed by processing system 1002, direct processing system 1002 to operate as described with respect to the various operational scenarios, sequences, and processes illustrated herein. For example, software 1005 may include program instructions for implementing dynamic contacts as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtualization software, or other application software. Software 1005 may also comprise firmware or some other form of machine-readable processing instructions executable by processing system 1002.

In general, software 1005 may, when loaded into processing system 1002 and executed, transform a suitable apparatus, system, or device (of which computing system 1001 is representative) overall from a general-purpose computing system into a special-purpose computing system customized to provide dynamic contacts as described herein. Indeed, encoding software 1005 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer readable storage media;
   one or more processors operatively coupled with the one or more computer readable storage media; and
   program instructions stored on the one or more computer readable storage media that, when executed by the one or more processors, direct the computing apparatus to at least:
   enable display, in a user interface to a first application, of a contact that identifies a person other than a user of the first application; and responsive to a user input, received via the user interface, that indicates selection of the contact:
  determine that the person and the user are in a collaboration group that is associated with a content item;
  determine that the person is presently active in the content item in a second application different from the first application, wherein the first application is any one of a group of applications capable of displaying the contact, and the content item is not editable by any of the group of applications; and
  surface, in the user interface, a contact card comprising an indication that the person is presently active in the content item.

2. The computing apparatus of claim 1 wherein:
the second application comprises one of a word processing application, a spreadsheet application, and a slide presentation application.

3. The computing apparatus of claim 1 wherein:
the first application comprises one of an email application, a dialer application, and a calendar application.

4. The computing apparatus of claim 1 wherein the program instructions further direct the computing apparatus to:
  determine that at least one other person is presently active in the content item; and
  surface, in the contact card, another indication that the at least one other person is presently active in the content item.

5. The computing apparatus of claim 4 wherein, the program instructions further direct the computing apparatus to, responsive to a selection of the other indication, surface, in the user interface, another contact card comprising details about the at least one other person.

6. The computing apparatus of claim 1 wherein the user input that indicates selection of the contact comprises a hover action over the contact.

7. The computing apparatus of claim 1 wherein the contact comprises an appearance that indicates the person is presently active in the second application.

8. A method comprising:
  enabling display, by a computing system in a user interface to a first application, of a contact that identifies a person other than a user of the first application; and
  responsive to a user input, received via the user interface, that indicates selection of the contact:
    determining that the person and the user are in a collaboration group that is associated with a content item;
    determining that the person is presently active in the content item in a second application different from the first application, wherein the first application is any one of a group of applications capable of displaying the contact, and the content item is not editable by any of the group of applications; and
    surfacing, in the user interface, a contact card comprising an indication that the person is presently active in the content item.

9. The method of claim 8 wherein:
The second application comprises one of a word processing application, a spreadsheet application, and a slide presentation application.

10. The method of claim 8 wherein:
the first application comprises one of an email application, a dialer application, and a calendar application.

11. The method of claim 8 further comprising:
determining that at least one other person is presently active in the content item; and
surfacing, in the contact card, another indication that the at least one other person is presently active in the content item.

12. The method of claim 11 further comprising, responsive to a selection of the other indication, surfacing, in the user interface, another contact card comprising details about the at least one other person.

13. The method of claim 8 wherein the user input that indicates selection of the contact comprises a hover action over the contact.

14. The method of claim 8 wherein the contact card comprises a link to the content item, the method further comprising:
  receiving, by the computing system via the user interface, a second user input that indicates selection of the link; and
  in response to receiving the second user input:
    launching, by the computing system, a third application different from each of the group of applications, and
    opening, by the computing system, the content item in the third application.

15. A computing apparatus comprising:
  one or more computer readable storage media;
  one or more processors operatively coupled with the one or more computer readable storage media; and
  a first application comprising program instructions stored on the one or more computer readable storage media that, when executed by the one or more processors, direct the computing apparatus to at least:
  enable display, in a user interface to the first application, of a contact that identifies a person other than a user of the first application;
  responsive to a user input, received via the user interface, that indicates selection of the contact:
    send a request to a collaboration service to determine whether the person and the user are in a collaboration group that is associated with a content item;
    receive a reply from the collaboration service that the person is presently active in the content item in a second application different from each of the first application, wherein the first application is any one of a group of applications capable of displaying the contact, and the content item is not editable by any of the group of applications; and
    surface, in the user interface, a contact card comprising an indication that the person is presently active in the content item.

16. The computing apparatus of claim 15 wherein:
The second application comprises one of a word processing application, a spreadsheet application, and a slide presentation application.

17. The computing apparatus of claim 15 where:
the first application comprises one of an email application, a dialer application, and a calendar application.

18. The computing apparatus of claim 15 wherein the program instructions further direct the computing apparatus to:
  send another request to determine whether at least one other person is presently active in the content item; and
  surface, in the contact card, another indication that the at least one other person is presently active in the content item.

19. The computing apparatus of claim 18 wherein the program instructions direct the computing apparatus to, responsive to a selection of the other indication, surface, in the user interface, another contact card comprising details about the at least one other person.

20. The computing apparatus of claim 15 wherein the user input that indicates selection of the contact comprises a hover action over the contact.

\* \* \* \* \*